United States Patent
Bjurel et al.

(10) Patent No.: US 8,994,782 B2
(45) Date of Patent: Mar. 31, 2015

(54) LOCAL MEDIA RENDERING

(75) Inventors: Jonas Bertil Bjurel, Tyresö (SE); Carl Staffan Ålund, Täby (SE); Anders K Eriksson, Uppsala (SE); Erlendur Karlsson, Uppsala (SE); Lars-Örjan Kling, Södertälje (SE); Thomas Lindquist, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 82 days.

(21) Appl. No.: 13/977,074

(22) PCT Filed: Jan. 4, 2011

(86) PCT No.: PCT/SE2011/050003
§ 371 (c)(1),
(2), (4) Date: Jun. 28, 2013

(87) PCT Pub. No.: WO2012/093954
PCT Pub. Date: Jul. 12, 2012

(65) Prior Publication Data
US 2014/0009567 A1  Jan. 9, 2014

(51) Int. Cl.
*H04N 7/14* (2006.01)
*H04L 12/18* (2006.01)
(Continued)

(52) U.S. Cl.
CPC .......... *H04N 7/147* (2013.01); *H04L 12/1881* (2013.01); *H04L 47/2408* (2013.01);
(Continued)

(58) Field of Classification Search
CPC  H04N 7/147; H04L 12/1881; H04L 47/2408; H04M 3/568

USPC ............. 348/14.01, 14.07, 14.08, 14.13; 370/252, 260, 328, 390, 401; 379/88.13; 709/203, 204, 223; 725/97, 725/98
See application file for complete search history.

(56) References Cited

U.S. PATENT DOCUMENTS 6,584,493 B1 *  6/2003  Butler .......................... 709/204
6,731,323 B2 *  5/2004  Doss et al. ................. 348/14.01
(Continued)

FOREIGN PATENT DOCUMENTS

JP  2004187170 A  7/2004
JP  2005341075 A  12/2005
(Continued)

OTHER PUBLICATIONS

Sakate, H. et al. "Resource Management for Quality of Service Guarantees in Multi-party Multimedia Application." Sixth International Conference on Network Protocols, Proceedings, Oct. 13-16, 1998, pp. 189-196, Austin, TX, USA.
(Continued)

*Primary Examiner* — Gerald Gauthier
(74) *Attorney, Agent, or Firm* — Murphy, Bilak & Homiller, PLLC

(57) ABSTRACT

The invention involves local media rendering of a multi-party call, performed by a Client User Equipment (1). The media is encoded by each party in the call, and sent as a media stream to a Media server (2), and the media server receives a request for media streams from each Client User Equipment, each media stream in the request associated with a client priority. The Media server selects the media streams to send to each Client User Equipment, based on the request, and further such that the number of streams does not exceed a determined maximum number, which is based e.g. on the available bandwidth.

20 Claims, 7 Drawing Sheets

(51) Int. Cl.
*H04L 12/851* (2013.01)
*H04M 3/56* (2006.01)
*H04N 7/15* (2006.01)
*H04L 29/06* (2006.01)

(52) U.S. Cl.
CPC ............... *H04M3/568* (2013.01); *H04N 7/15* (2013.01); *H04L 65/605* (2013.01); *H04L 65/4038* (2013.01); *H04L 69/24* (2013.01); *H04M 2201/18* (2013.01)
USPC ................. 348/14.13; 348/14.01; 348/14.07; 348/14.08; 370/252; 370/260; 370/328; 370/352; 370/401; 379/88.13; 709/203; 709/204; 709/223; 725/97; 725/98

(56) References Cited

U.S. PATENT DOCUMENTS

| | | | |
|---|---|---|---|
| 6,760,749 B1 * | 7/2004 | Dunlap et al. | 709/204 |
| 6,775,247 B1 * | 8/2004 | Shaffer et al. | 370/260 |
| 6,868,444 B1 * | 3/2005 | Kim et al. | 709/223 |
| 6,894,715 B2 * | 5/2005 | Henrikson | 348/14.07 |
| 7,009,971 B2 * | 3/2006 | Novaes | 370/390 |
| 7,225,459 B2 * | 5/2007 | Magliaro | 725/98 |
| 7,613,137 B2 * | 11/2009 | Swanson et al. | 370/260 |
| 8,739,234 B1 * | 5/2014 | Cheung et al. | 725/97 |
| 2004/0111472 A1 * | 6/2004 | Swanson et al. | 709/204 |
| 2004/0236593 A1 | 11/2004 | Swanson et al. | |
| 2005/0237377 A1 * | 10/2005 | Chapweske et al. | 348/14.08 |
| 2006/0291412 A1 * | 12/2006 | Naqvi et al. | 370/328 |
| 2006/0291487 A1 * | 12/2006 | Naqvi et al. | 370/401 |
| 2008/0133555 A1 * | 6/2008 | Rhoads et al. | 707/100 |
| 2009/0052339 A1 * | 2/2009 | Spring et al. | 370/252 |
| 2010/0166159 A1 * | 7/2010 | Katis et al. | 379/88.13 |
| 2010/0315484 A1 | 12/2010 | Ramanathan et al. | |
| 2011/0051718 A1 * | 3/2011 | Sharp | 370/352 |
| 2011/0252083 A1 * | 10/2011 | Ranney | 709/203 |
| 2014/0009567 A1 * | 1/2014 | Bjurel et al. | 348/14.13 |

FOREIGN PATENT DOCUMENTS

| | | |
|---|---|---|
| WO | 2008121032 A1 | 10/2008 |
| WO | 2009046758 A1 | 4/2009 |
| WO | 2009092060 A2 | 7/2009 |

OTHER PUBLICATIONS

Smith, P.J. et al. "Speaker Selection for Tandem-Free Operation VOIP Conference Bridges." IEEE Workshop Proceedings, Speech Coding, Oct. 6-9, 2002, pp. 120-122.

* cited by examiner

LOCAL MEDIA RENDERING

TECHNICAL FIELD

The present invention relates to a method for a Media Server of delivering media streams to a Client User Equipment for local rendering, and a method for a Client User Equipment of receiving media streams for local rendering from a Media Server. The invention also relates to a Media Server and to a Client User Equipment.

BACKGROUND

Conventionally, a technical implementation of a multi-party call, e.g. a voice conference, would typically comprise a central mixing device for mixing the media streams originating from the participants in the conference into only one media stream per media type, to be delivered to every participating client. For a voice conference, this corresponds to one mono media stream or one artificial stereo media stream. One reason for delivering only one media stream to each participant was the limited access bandwidth.

However, in recent technologies, such as e.g. the VDSL2 (Very high speed Digital Subscriber Line 2), a much larger access bandwidth is available, which removes the bandwidth limitation, at least in applications with a low or moderate bandwidth requirement, such as e.g. a voice conference.

In order to provide true stereo or 3D (Three-Dimensional) positional audio to each participant in a multi-party call, a unique media stream has to be rendered for each client, based on the orientation and position of the client, and on the position and orientation of the other participants in the call. Thus, the central rendering framework needs information regarding the location and orientation of each participant, and has to implement one rendering engine for each client. Further, these rendering engines have to be constantly updated with the position and orientation for each participant. This is especially challenging in large and highly dynamic conference call, such as in virtual world gaming. In such an advanced audio mixing scenario, involving a large number of participants in a multi-party call, a central voice mixing will lead to complicated system architecture for the media rendering, requiring a very large processing capacity in the central voice mixing device.

In a conventional central rendering, a media server, typically a conference bridge comprising a mixer, handles basically everything, including audio processing, rendering of 3D positional audio, as well as the encoding of the created 3D positional audio signals for each client. The client user equipments belonging to each participant will only decode each respective encoded signal, and possibly present a GUI (Graphical User Interface) to the user. For each participating client user equipment, the conference bridge will create a 3D positional audio signal, which requires 3D positional audio rendering of the incoming voice signals from all the participants. Since a unique 3D positional audio signal is created for each participant, the number of output signals to encode will correspond to the number of participants.

Further, in a conventional central rendering, the latency in the positional information in highly interactive application may make a faithful voice rendering impossible, and thus deteriorate the user experience.

In a local rendering, on the contrary, the main task of the central media server is to decide which media streams of a multi-party call that should be redirected to which client user equipment for local rendering, such as e.g. the media streams from all the participants, or alternatively from only a few actively speaking participants. Upon receiving the selected media streams from the media server, the client user equipment of each participant will perform local media rendering. If no transcoding is needed in the media server, i.e. if all the client user equipments support the codecs of every other client user equipment, the media server only has to re-direct the incoming media streams, and not perform any encoding or audio rendering.

WO2009/092060 describes a system for rendering of the media locally in the client. A local rendering of 3D positional audio requires less processing capacity in the central device, i.e. a media server, and reduces the latency in the positional information. In the system described in WO2009/092060, each media stream contains the media data (i.e. the voice) and the positional information (i.e. the location and energy of the media component). Furthermore, WO2009/092060 discloses a per-participant "filter component" (see e.g. 111 in FIG. 1) that accesses the positional information and the media streams of all participants, as well as local information related to the participants. However, the implementation of the system is comparatively complicated.

SUMMARY

It is an object of the embodiments described hereinafter to address at least some of the issues outlined above, and this object and others are achieved by the method and the arrangement according to the appended independent claims, and by the embodiments according to the dependent claims.

According to a first aspect, a method is provided for a Media Server in a telecommunication network of delivering media streams received from a multi-party call to a participating Client User Equipment for local audio or video media rendering. The method comprises the Media server determining a maximum number of media streams to be delivered simultaneously, based on a negotiation with the Client User Equipment. Further, the Media server will regularly receive an updated request for media streams from the Client User Equipment, the request indicating a client priority for each media stream. The Media server will select media streams from the request based on the client priority of the requested media streams, and on that the number of selected media streams shall not exceed the determined maximum number of media streams, and send the selected media streams to the Client User Equipment for local rendering of the multi-party call.

According to a second aspect, a method is provided for a Client User Equipment in a telecommunication network of receiving media streams from a Media server for local rendering of audio or video media of a multi-party call. The method comprises the Client User Equipment regularly sending an updated request for media streams to the Media server, the request indicating a client priority for each media stream. Further, the Client User Equipment will receive media streams from the Media Server, the media streams selected by the Media server based on the client priority of the requested media streams, and on that the number of media streams shall not exceed a determined maximum number of media streams.

According to a third aspect, a Media server is provided that is connectable to a telecommunication system, and configured to deliver media streams received from a multi-party call to a participating Client User Equipment for local audio or video media rendering. The Media Server comprises a determining unit for determining a maximum number of media streams to be delivered simultaneously, based on a negotiation with the Client User Equipment, and a receiving unit for regularly receiving an updated request for media streams from the Client User Equipment, the request indicating a client priority for each requested media stream. Further, the Media server comprises a selection unit for selecting media streams from a received request, the selection based on the client priority of the requested media streams, and on that the number of selected media streams shall not exceed the determined maximum number of streams. The Media server also comprises a sending unit for sending the selected media streams to the Client User Equipment for local rendering of a multi-party call.

According to a fourth aspect, a Client User Equipment is provided that is connectable to a telecommunication network, and configured to receive media streams from a Media server for local rendering of audio or video media of a multi-party call. The Client User Equipment comprises a requesting unit for creating a request for media streams, the request indicating a client priority for each media stream, and a sending unit for regularly sending an updated request to the Media Server. The Client User Equipment further comprises a first receiving unit for receiving media streams from the Media server, the media streams selected by the Media Server based on the client priority of the requested media streams, and on that the number of received media streams shall not exceed a determined maximum number of media streams.

An advantage with exemplary embodiments is to provide a comparatively non-complicated local rendering of large and highly dynamic conferences, by utilizing low-cost and under-utilized client resources instead of costly central resources, and transmitting the media streams separately from other information.

BRIEF DESCRIPTION OF THE DRAWINGS

Exemplary embodiments of the invention will now be described in more detail, and with reference to the accompanying drawings, in which.

DETAILED DESCRIPTION

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

A concept according to exemplary embodiments described hereinafter is to provide a highly dynamic local media rendering of a multi-party call, with the rendering information being transmitted separately from the media streams. According to an exemplary embodiment, the participating Client User Equipments receives rendering information, e.g. geographical properties, regarding other participating Client User Equipments located in the vicinity from a media application in a data server. Thereby, the Media server does not need to have this information.

Instead, each participating Client User Equipment requests the media server to deliver selected media-streams, typically from other participating Client User Equipments located within a reasonable distance. The request also includes a priority for each media stream, hereinafter denoted client priority, and the client priority may be based e.g. of the position of the "source" of the media stream, each source corresponding to another participating Client User Equipment. The Media server decides which media streams to deliver to each Client User Equipment, based e.g. on the client priority of the requested media streams, but the media streams may also be weighted and given a priority by the Media Server. This priority is based on one or more properties of the media stream, e.g. the signal strength, and is hereinafter denoted media priority. Further, the number of media streams must not exceed a maximum number of media streams that can be transmitted simultaneously to the Client User Equipment, and the maximum number is determined in a negotiation with a Client User Equipment, normally at the beginning of a session.

Figure 1:
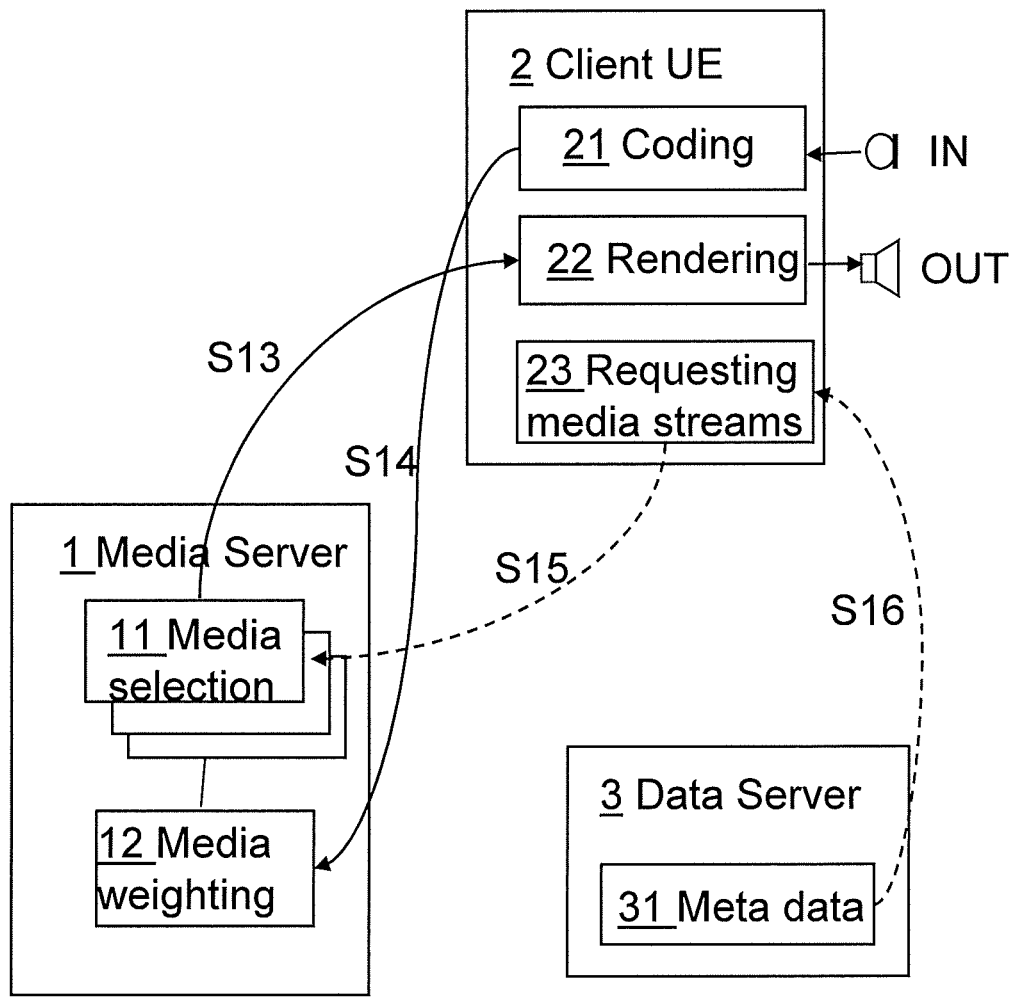
FIG. 1 schematically illustrates an exemplary architecture for local media rendering.

FIG. 1 illustrates schematically an exemplary architecture for the above-described local rendering, comprising a number of Client User Equipments running a media application, which is controlled by a Data Server 3. However, only one Client User Equipment 2 is illustrated in FIG. 1. In the Client User Equipment 2 is further illustrated a step of encoding 21 the media input by an end-user to the Client User Equipment, a step of rendering 22 media for output to the end-user, and a step of requesting 23 media streams from the Media server 1, the request communicated to the Media Server in signal 515. The media application includes media, such as e.g. real-time voice or video, and the media is served to the Clients by a Media Server 1. The media that is included in the media application is rendered locally in the Client User Equipment, in step 22, according to rendering information received from the Data Server in signal S16. The rendering information may comprise e.g. geographical properties of the participating Client User Equipments, since this information would be required for 3D-rendering.

As mentioned above, the Client User Equipment 2 and the Media Server 1 negotiates at the establishment of a session in order to determine a maximum number of media streams that may be transferred simultaneously from the Media Server to the Client User Equipment. This maximum number of media streams is determined based e.g. on the available bandwidth and/or on the capability of the Client User Equipment to process the received media streams. However, the determined number of media streams may be re-negotiated during the session, if this is required by the Media server or by the Client User Equipment.

During the session, the Client User Equipment continuously decides, in the requesting step 23, which media streams it wishes to receive from the Media Server on the available media streams, based on request information (meta-data)

associated with the media streams, i.e. with the source Client User Equipment of each media stream. The meta-data 31 is provided to the Client User Equipment 2 by the Data Server 3 in signal S16, but it may also be provided by an end-user (not illustrated in FIG. 1). Thus, the request information may comprise e.g. location information associated with the source Client User Equipment, as provided by the Data Server, a manual input by an end-user, application-specific information provided by the Data server, and/or a priority associated with each participating Client User Equipment, also provided by the Data Server. Based on the meta-data associated with each of the other participating Client User Equipments, which are the sources of the media streams, the Client User Equipment regularly sends an updated request, in signal S15, to the Media Server to receive selected media streams. The media stream may be indicated in the request e.g. as a listing of the identities of the sources, i.e. Client User Equipments, from which the Client User Equipments wishes to receive a media stream for local rendering. Further, the listing comprises a client priority associated with each media stream, the client priority indicating a weighting of the media stream, which is based on the above-described request information (meta-data).

The encoded media streams are received, in signal S14, by the Media server from all the participating Client User Equipments in a multi-party call, even though only one Client and one signal is illustrated in FIG. 1. Based on the request from a Client User Equipment, the Media Server 1 continuously decides, in the media selection step 11, which media streams to deliver to each Client User Equipment, and to send, in signal S13, to the Client User Equipment 2 on the available media streams between the Media Server and the Client User Equipment. This decision by the Media Server is based on the client priority indicated in the request received in signal S15 from the Client User Equipment, but it may also be based on a media priority determined by the Media server, in a media weighting step 12. This media weighting could be based on one or more properties of the media stream, e.g. on the signals strength. Further, the selection of which media streams to deliver is also based on the determined maximum number of media streams that can be transmitted simultaneously to the Client User Equipment.

Thus, in FIG. 1, the media streams S13 and S14 are illustrated by unbroken lines, while the information signal S15 and S16 are illustrated by dashed lines, in order to emphasize that the media streams are transmitted separately from information that is required for a rendering of the media.

According to an exemplary embodiment, this Media Server may implement the selection by adding the media priority for each media stream to the corresponding client priority in the request received from the Client User Equipment, and selecting the media streams with the highest total priority, and also delimiting the number of media stream to not exceed the determined maximum number of media streams.

The source Client User Equipments may be identified in a request by an arbitrary global identifier, which is known to the Client User Equipment, e.g. by an SSRC in the RTP (Real-Time Protocol), and the request is communicated from the Client User Equipment to the Media server via a suitable protocol, e.g. an extension of the BFCP (Binary Floor Control Protocol).

The communication of the global identifier between the respective Client User Equipments is typically performed via the Data Server 3.

Figure 2:
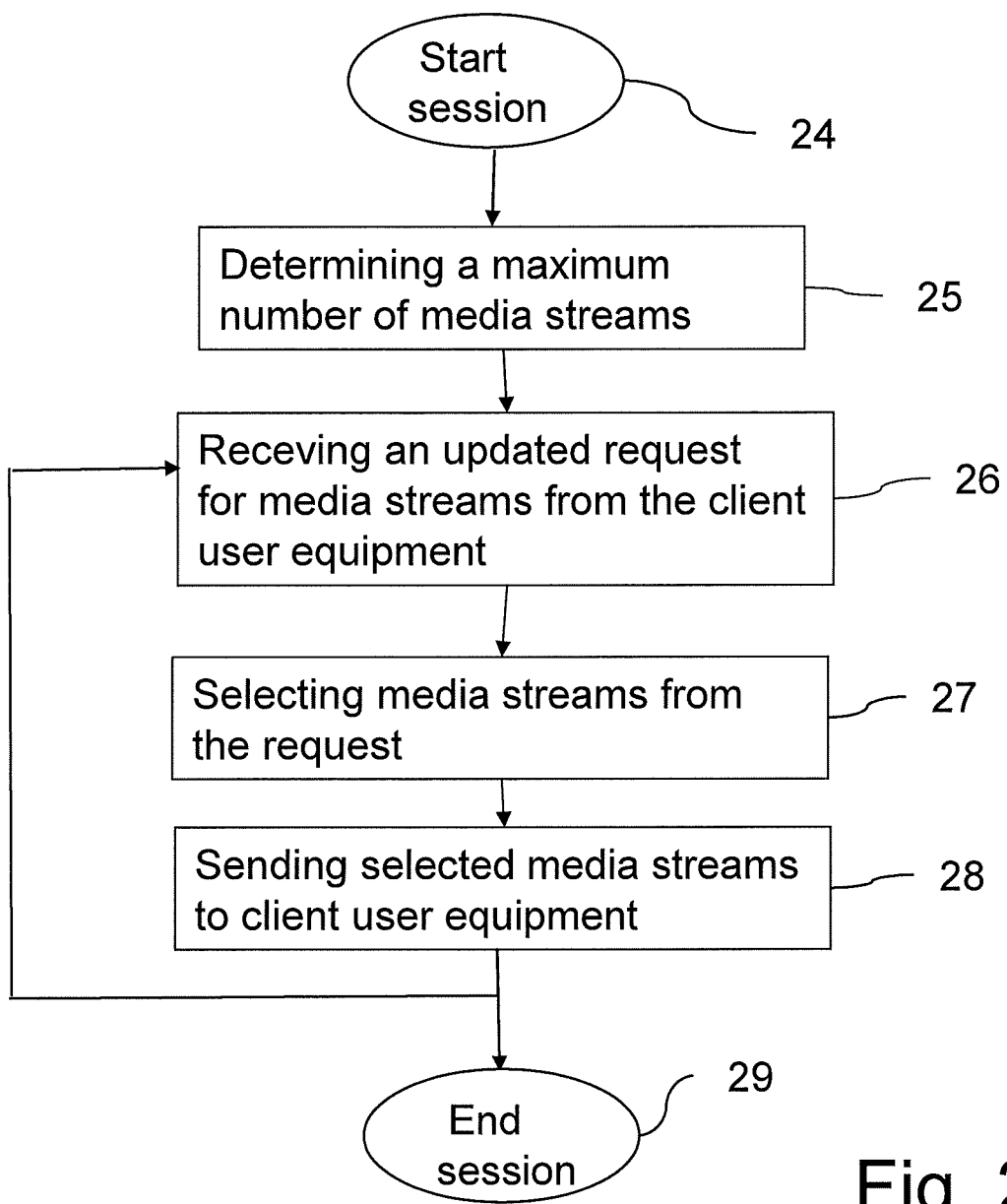
FIG. 2 is a flow diagram schematically illustrating an exemplary method for a Media Server.

FIG. 2 is a flow diagram illustrating exemplary embodiments of a method for a Media Server 1 of delivering media streams from a multi-party call to a Client User Equipment 2 for local rendering. After the start of the session, in step 24, the Media Server determines, in step 25, a maximum number of media streams that can be transmitted simultaneously to the Client User Equipment. The determining is performed in a negotiation with the Client User Equipment, and may be based e.g. on the available bandwidth and on the capabilities of the Client User Equipment.

In step 26, the Media server receives a request from the Client User Equipment, the request indicating media streams that the Client User Equipments wants to receive from the Media Server. Each media stream in the request is associated with a client priority indicating a weighting of the media stream, such that a media stream associated with a higher priority shall be selected for transmission to the Client User Equipment, before a media stream associated with a lower priority. The client priority indicated in the request may be based e.g. on geographical properties of the source Client User Equipments, on a priority received from the Data Server, on application-specific information, and/or on a selection by the end-user.

In step 27, the Media Server decides which media streams to send to the Client User Equipment by selecting a number of streams from the request. The selection is based on the client priority of the media streams indicated in the request, and on that the number of media streams shall not exceed the determined maximum number of media streams that can be transmitted to the Client User Equipment. According to a further embodiment, the Media server performs a weighting of the media streams, e.g. based on the signal strength, and associates the weight with each media stream as a media priority, to be included in the decision. Next, in step 28, the Media Server sends the selected media streams to the Client User Equipment.

Since the Client User Equipment regularly sends an updated request to the Media server, the steps 26-28 are repeated until the session is terminated, in step 29.

Figure 3:
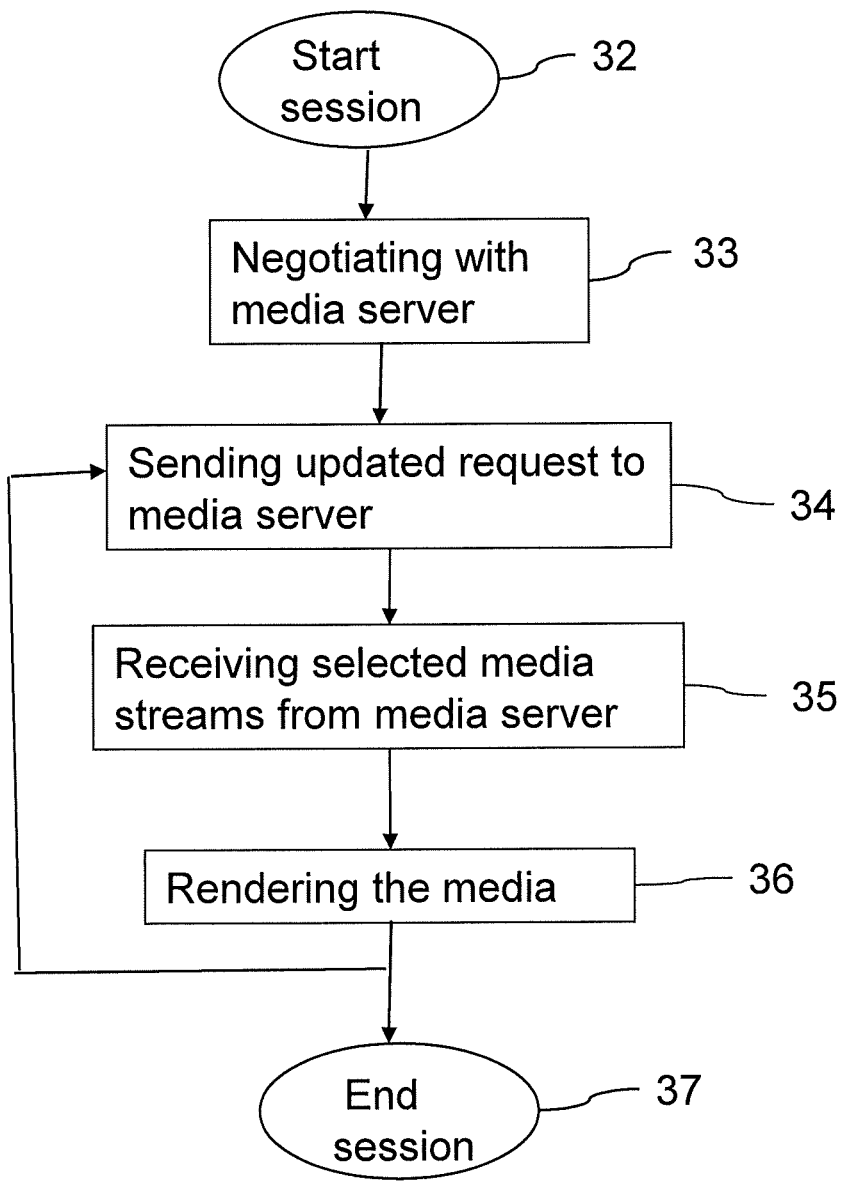
FIG. 3 is a flow diagram schematically illustrating an exemplary method for a Client User Equipment.

FIG. 3 is a flow diagram illustrating an exemplary embodiment of a method for a Client User Equipment of receiving a media stream from a Media server for local rendering.

After the start of the session, in step 32, the Client User Equipment negotiates, in step 33, with the Media server for determining a maximum number of media streams that it can receive simultaneously from the Media server, based e.g. the available bandwidth and on the capabilities of the Client User Equipment.

In step 34, the Client User Equipment sends a request to the Media server, the request indicating media streams that the Client User Equipments wants to receive from the Media Server. Each media stream in the request is associated with a client priority indicating a weighting of the media stream, such that the Client User Equipment prefers to receive a media stream with a higher priority, before a media stream with a lower priority. The priority indicated in the request may be based e.g. on geographical properties of the source Client User Equipments, on a priority received from the Data Server, and/or on a selection by the end-user.

In step 35, the Client User Equipment receives media streams from the Media server, as selected by the Media Server from the request. The selection is based on the client priority of the media streams indicated in the request, and on that the number of media streams shall not exceed the determined maximum number of media streams that can be transmitted simultaneously to the Client User Equipment. According to a further embodiment, the Media server performs a weighting of the media streams, e.g. based on the signal strength, and includes as a media priority in the decision.

Upon receiving the media streams, the Client User Equipment performs a local rendering of the media of the multi-party call, based on appropriate rendering information, such as e.g. the geographical properties of the source Client user Equipments, as received separately from the media streams as meta-data from the Data server 3.

The Client User Equipment regularly sends an updated request to the Media server during the session, and the steps 34-36 are repeated until the session is terminated, in step 37.

Figure 4:
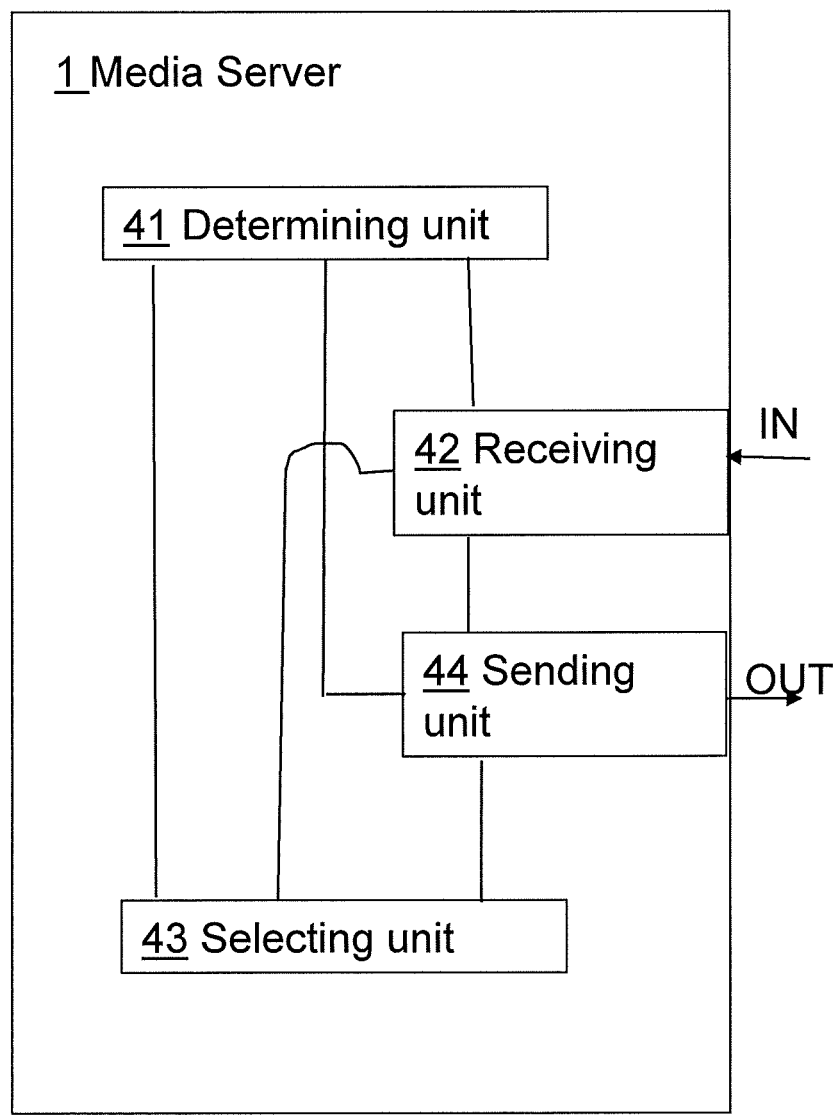
FIGS. 4 and 5 schematically illustrates an exemplary Media Server.

FIG. 4 schematically illustrates a Media Server 1, according to exemplary embodiments. The Media Server comprises a Determining unit 41 for determining a maximum number of media streams that can be delivered simultaneously to a Client User Equipment. The determining is performed in a negotiation with the Client User Equipment, and is based e.g. on the available bandwidth and/or on capabilities of the Client User Equipment.

Further, the Media server is provided with a communication unit for communicating with the Client User Equipment, the communication unit comprising a Receiving unit 42 for regularly receiving a request from the Client User Equipment, the request comprising an indication of the media streams that the Client User Equipment wants to receive, with each media stream associated with a client priority indicating a weighting of the media stream. The Receiving unit 42 may also be configured to receive the encoded media streams from the participating Client User Equipments. However, since the media streams are received separately from the requests, they are preferably received by a separate receiving unit (not illustrated in the figure).

Further, the Media Server comprises a Selecting unit 43 for selecting the media streams to send to the Client User Equipment from the request, the selection based on the client priority indicated in the request, and also taking into account that the number of transmitted media stream shall not exceed the determined maximum number of media streams. The above-mentioned communication unit also comprises a Sending unit 44 for sending the selected media streams to the Client User Equipment.

According to a further embodiment, the Selecting unit is also configured to base the selection of the media streams on a weighting of the media streams performed by the Media server, based on properties of the media streams, e.g. on the signal strength, and associated with each media stream as a media priority.

Figure 5:
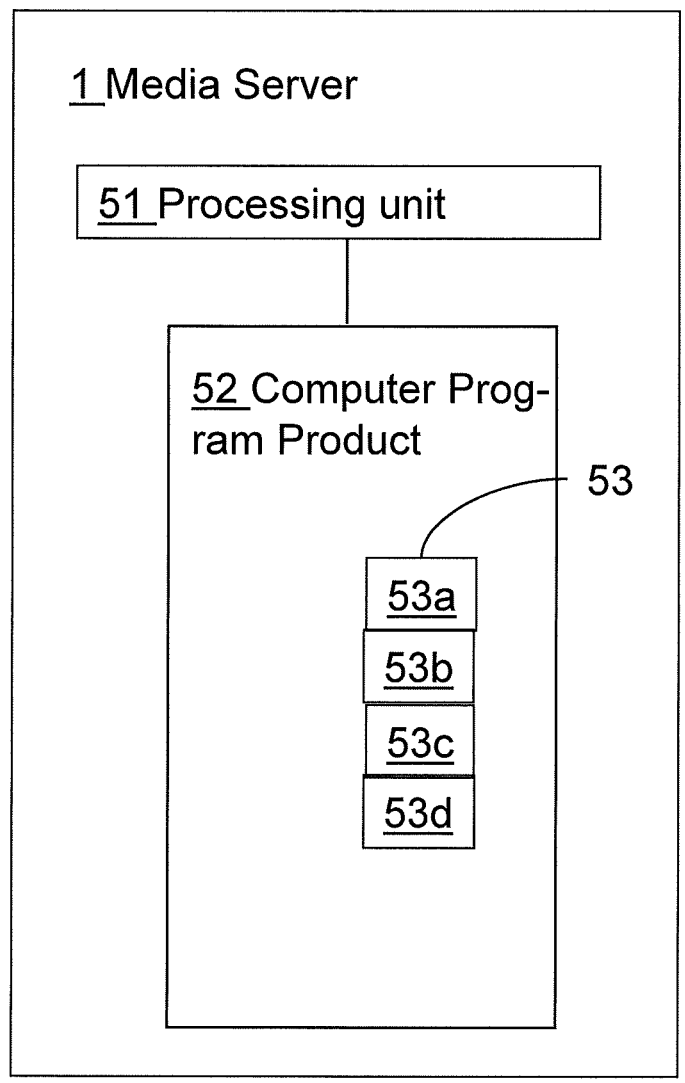

FIG. 5 schematically illustrates an embodiment of the Media server, which is an alternative way of disclosing the embodiment illustrated in FIG. 4. The Media server 1 comprises a processing unit 51 which may be a single unit or a plurality of units. Furthermore, the Media server 1 comprises at least one computer program product 52 in the form of a non-volatile memory, e.g. an EEPROM (Electrically Erasable Programmable Read-Only Memory), a flash memory or a disk drive. The computer program product 52 comprises a computer program 53, which comprises code means which when run on the Media server 1 causes the processing unit 51 in the Media server to perform the steps of the procedures described earlier in conjunction with FIG. 2.

Hence, in the embodiments illustrated in FIG. 5, the code means in the computer program 53 of the Media server 1 comprises a determining module 53a, a receiving module 53b, a selecting module 53c, and a sending module 53d. The modules 53a-53d essentially perform the steps of the flow in FIG. 2 to emulate the Media server described in FIG. 4. In other words, when the different modules 53a-53d are run on the processing unit 51, they correspond to the units 41, 42, 43 and 44 of FIG. 4, which are further explained above in connection with the description text associated with FIG. 4.

Although the code means in the embodiment disclosed above in conjunction with FIG. 5 are implemented as computer program modules which when run on the Media Server 1 causes the node to perform the steps described above in conjunction with FIG. 2, one or more of the code means may in alternative embodiments be implemented at least partly as hardware circuits.

Figure 6:
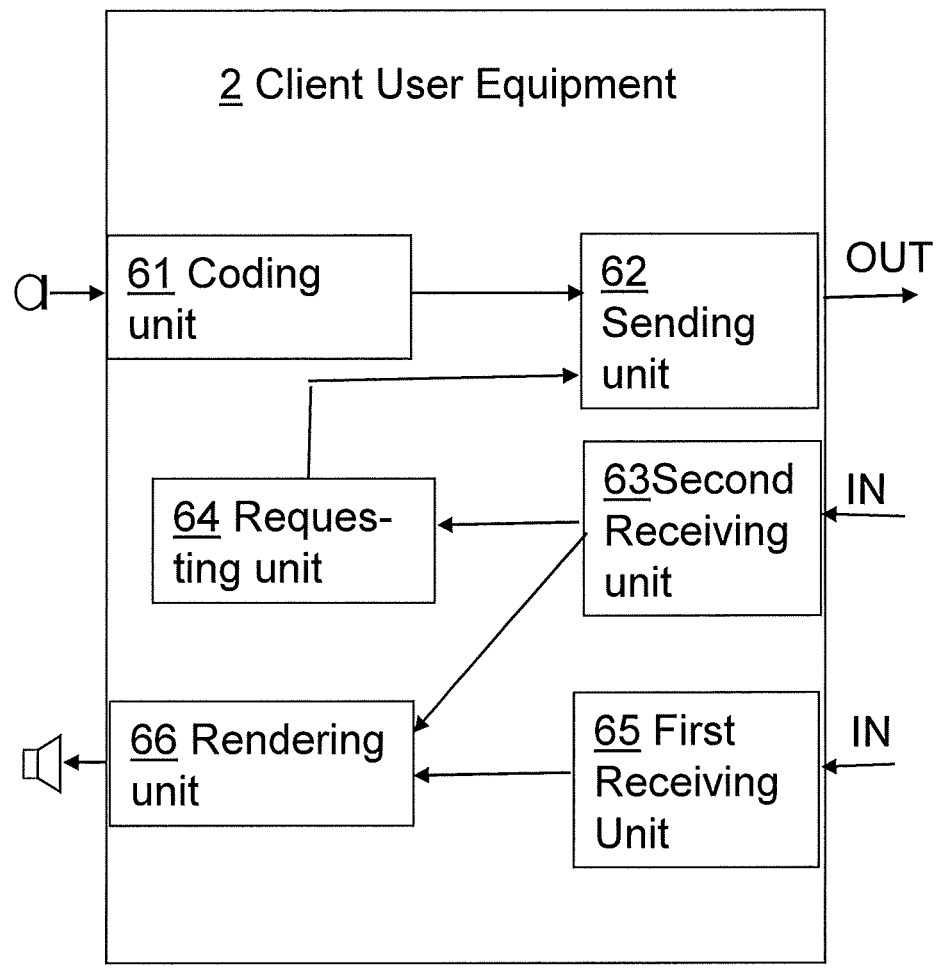
FIGS. 6 and 7 schematically illustrates an exemplary Client User Equipment.

FIG. 6 illustrates schematically a Client User Equipment, according to an exemplary embodiment. The Client User Equipment is provided with a Coding unit 61 for encoding the media, e.g. voice from a local user, and a Rendering unit 66 for rendering e.g. a multi-party call using media streams received from the Media server 1, and rendering information received separately from the media streams. Thus, the Client User Equipment is provided with a first Receiving unit 65 for receiving media streams for the rendering from the Media server, the media streams selected by the Media server from a request received from the Client User Equipment. Accordingly, the Client User Equipment also comprises a Requesting unit 64 for creating a request to the Media server, the request indicating media streams that the Client User Equipment wants to receive, each media stream associated with a client priority for the media stream. The client priorities for each stream may be determined based e.g. on location information application-specific information, as received from a Data server 3, but also on a selection by an end-user. An updated request is regularly sent to the Media server by a Sending unit 62, which may also be used for sending the encoded media to the Media server. However, since the media streams are transmitted separately from the requests, the Client User Equipment is preferably provided with a separate sending unit for the media streams (not illustrated in the figure).

According to a further exemplary embodiment, the Client User Equipment comprises a second Receiving unit 63 for receiving meta-data from the Data server, separately from the media streams, such as e.g. geographical properties associated with other Client User Equipments participating in a multi-party call. The meta-data is used by the Requesting unit 64 for creating the request and for determining the client priorities of the requested media streams, but also by the Rendering unit 66 for performing the media rendering. Thus, the meta-data received from the Data server may be used by the Client User Equipment both as request information and as rendering information.

Figure 7:
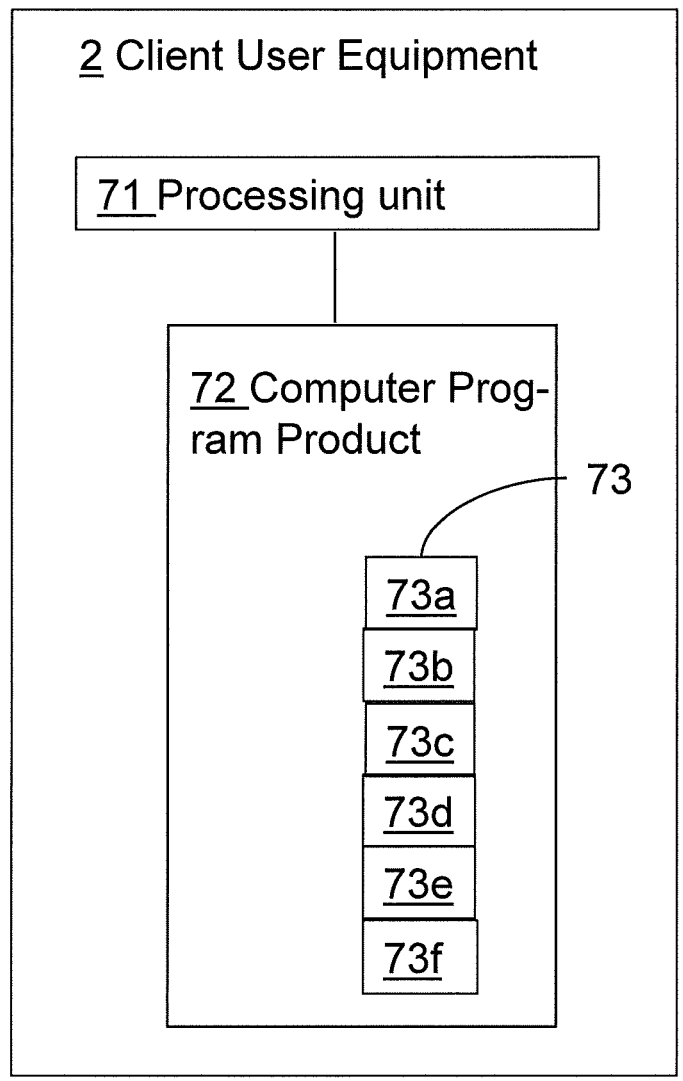

FIG. 7 schematically illustrates an embodiment of the Client User Equipment 2, which is an alternative way of disclosing the embodiment illustrated in FIG. 6. The Client User Equipment 2 comprises a processing unit 71 which may be a single unit or a plurality of units. Furthermore, the Client User Equipment 2 comprises at least one computer program product 72 in the form of a non-volatile memory, e.g. an EEPROM (Electrically Erasable Programmable Read-Only Memory), a flash memory or a disk drive. The computer program product 72 comprises a computer program 73, which comprises code means which when run on the Client User Equipment 2 causes the processing unit 71 to perform the steps of the procedures described earlier in conjunction with FIG. 3.

Hence, in the embodiments illustrated in FIG. 7, the code means in the computer program 73 of the Client User Equipment 2 comprises a coding module 73a, a sending module 73b, a second receiving module 73c, a requesting module 73d, a first receiving module 73e and a rendering module 73f. The code means may thus be implemented as computer program code structured in computer program modules. The modules 73a-73f essentially perform the steps of the flow in FIG. 3 to emulate the Client User Equipment 2 described in FIG. 6. In other words, when the different modules 73a-73f are run on the processing unit 71, they correspond to the units 61, 62, 63, 64, 65, and 66 of FIG. 6, which are further explained above in connection with the description text associated with FIG. 6.

Although the code means in the embodiment disclosed above in conjunction with FIG. 7 are implemented as computer program modules which when run on the Client User Equipment 2 causes the node to perform the steps described above in conjunction with FIG. 3, one or more of the code means may in alternative embodiments be implemented at least partly as hardware circuits.

Thus, as implied above, it should be noted that the Media server 1, as illustrated in FIGS. 4 and 5, and the Client User Equipment 2, as illustrated in FIGS. 6 and 7, may be implemented by physical or logical entities using software functioning in conjunction with a programmed microprocessor or general purpose computer, and/or using an application specific integrated circuit (ASIC). They may further include suitable internal and external storage devices, as well as appropriate communication interfaces, including hardware and software capable of performing the necessary modulating, coding, filtering and the like, as well as demodulating and decoding to process such signals.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method, in a Media Server in a telecommunication network, of delivering media streams received from a multi-party call to a participating Client User Equipment for local audio or video media rendering, the method comprising:
    determining a maximum number of media streams to be delivered simultaneously, based on a negotiation with the Client User Equipment;
    regularly receiving an updated request for media streams from the Client User Equipment, the request indicating a client priority for each media stream;
    selecting media streams from the request, the selection based on the client priority of the requested media streams, and on that the number of selected media streams shall not exceed the determined maximum number of media streams; and
    sending the selected media streams to the Client User Equipment for local rendering of the multi-party call, wherein the rendering is based on rendering information transmitted separately from the media streams.

2. The method of claim 1, further comprising the Media server associating a media priority with each media stream, wherein the selecting of media streams is further based on said media priority.

3. The method of claim 2, wherein the media priority associated with a media stream is based on at least one property of a received media stream.

4. The method of claim 1, wherein the determining of the maximum number of media streams is based on an available bandwidth.

5. The method of claim 1, wherein the determining of the maximum number of media streams is based on capabilities of the Client User Equipment.

6. The method of claim 1, wherein the client priority is based on at least one of location information, application-specific information, or a selection by an end-user.

7. A method, in a Client User Equipment in a telecommunication network, of receiving media streams from a Media server for local rendering of audio or video media of a multi-party call, the method comprising:
    regularly sending an updated request for media streams to the Media server, the request indicating a client priority for each media stream;
    receiving media streams from the Media Server, the media streams selected by the Media server based on the client priority of the requested media streams, and further based on that the number of media streams shall not exceed a determined maximum number of media streams; and
    rendering the media streams of the multi-party call locally in the Client User Equipment, based on rendering information received separately from the media streams.

8. The method of claim 7, wherein the received media streams are selected by the Media Server further based on a media priority determined by the Media server and associated with the media streams.

9. The method of claim 7, wherein the maximum number of media streams is determined in a negotiation with the Media server, based on an available bandwidth.

10. The method of claim 7, wherein the maximum number of media streams is determined in a negotiation with the Media server, based on capabilities of the Client User Equipment.

11. The method of claim 7, wherein the client priority is based on at least one of location information, application-specific information, or a selection by an end-user.

12. A Media Server connectable to a telecommunication system and configured to deliver media streams received from a multi-party call to a participating Client User Equipment for local audio or video media rendering, the Media Server comprising:
    a determining circuit configured to determine a maximum number of media streams to be delivered simultaneously, based on a negotiation with the Client User Equipment;
    a receiving circuit configured to regularly receive an updated request for media streams from the Client User Equipment, the request indicating a client priority for each requested media stream;
    a selection circuit configured to select media streams from a received request, the selection based on the client priority of the requested media streams, and further based on that the number of selected media streams shall not exceed the determined maximum number of streams; and
    a sending circuit configured to send the selected media streams to the Client User Equipment for local rendering of a multi-party call, wherein the rendering is based on rendering information transmitted separately from the media streams.

13. The Media Server of claim 12, wherein the selection circuit is further configured to select media streams based on a media priority associated with each media streams and determined by the Media server.

14. The Media Server of claim 13, wherein the media priority is based on at least one property of a received media stream.

15. The Media Server of claim 12, wherein the determining circuit is further configured to base the maximum number of media streams on an available bandwidth.

16. The Media Server of claim 12, wherein the determining circuit is further configured to base the maximum number of media streams on capabilities of the Client User Equipment.

17. A Client User Equipment connectable to a telecommunication network and configured to receive media streams from a Media server for local rendering of audio or video media of a multi-party call, the Client User Equipment comprising:
- a requesting circuit configured to create a request for media streams, the request indicating a client priority for each media stream;
- a sending circuit configured to regularly send an updated request to the Media Server;
- a first receiving circuit configured to receive media streams from the Media server, the media streams selected by the Media Server based on the client priority of the requested media streams, and further based on that the number of received media streams shall not exceed a determined maximum number of media streams, and
- a rendering circuit configured to perform local rendering of media streams of the multi-party call, based on rendering information received separately from the media streams.

18. The Client User Equipment of claim 17, comprising a second receiving circuit configured to receive meta-data from a data server.

19. The Client User Equipment of claim 17, further comprising a coding circuit for coding a media-input in the Client User Equipment.

20. The Client User Equipment of claim 17, wherein the requesting circuit is further configured to base the client priority on at least one of location information, application-specific information, and a selection by an end-user.

* * * * *

UNITED STATES PATENT AND TRADEMARK OFFICE
CERTIFICATE OF CORRECTION

PATENT NO. : 8,994,782 B2  
APPLICATION NO. : 13/977074  
DATED : March 31, 2015  
INVENTOR(S) : Bjurel et al.

It is certified that error appears in the above-identified patent and that said Letters Patent is hereby corrected as shown below:

Title page, item (75), under "Inventors", in Column 1, Line 2, delete "Anders K" and insert -- Anders K. --, therefor.

In the Specification

In Column 4, Line 43, delete "signal 515." and insert -- signal S15. --, therefor.

Signed and Sealed this  
Eleventh Day of August, 2015

Michelle K. Lee  
*Director of the United States Patent and Trademark Office*